(12) United States Patent
Meng et al.

(10) Patent No.: US 8,888,382 B2
(45) Date of Patent: Nov. 18, 2014

(54) OPTICAL-ELECTRICAL CONNECTOR ASSEMBLY HAVING A SECURING MEMBER

(71) Applicants: Jin-Hua Meng, Kunshan (CN);
Ya-Dong Zhu, Kunshan (CN);
Yun-Cheng Hou, New Taipei (TW);
John Chow, Saratoga, CA (US)

(72) Inventors: Jin-Hua Meng, Kunshan (CN);
Ya-Dong Zhu, Kunshan (CN);
Yun-Cheng Hou, New Taipei (TW);
John Chow, Saratoga, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/740,476

(22) Filed: Jan. 14, 2013

(65) Prior Publication Data

US 2013/0183009 A1    Jul. 18, 2013

(30) Foreign Application Priority Data

Jan. 12, 2012    (CN) .......................... 2012 2 0012547

(51) Int. Cl.
*G02B 6/36* (2006.01)
*G02B 6/42* (2006.01)

(52) U.S. Cl.
CPC ...................................... *G02B 6/42* (2013.01)

USPC .................. 385/90; 385/85; 385/86; 385/87; 385/89; 385/91; 385/92; 385/93; 385/94

(58) Field of Classification Search
USPC ....................................................... 385/53–94
See application file for complete search history.

(56) References Cited

U.S. PATENT DOCUMENTS

| | | | |
|---|---|---|---|
| 5,214,730 A | 5/1993 | Nagasawa et al. | |
| 7,070,339 B2 * | 7/2006 | Nagasaka et al. | 385/88 |
| 7,583,867 B2 * | 9/2009 | Terada et al. | 385/14 |
| 7,766,557 B2 * | 8/2010 | Durrant | 385/88 |
| 8,465,213 B2 * | 6/2013 | Tamura et al. | 385/92 |
| 2011/0081119 A1 * | 4/2011 | Togami et al. | 385/89 |
| 2012/0027364 A1 * | 2/2012 | Tamura et al. | 385/92 |
| 2012/0163754 A1 * | 6/2012 | Benjamin et al. | 385/33 |

* cited by examiner

*Primary Examiner* — Ryan Lepisto
*Assistant Examiner* — Guy Anderson
(74) *Attorney, Agent, or Firm* — Ming Chieh Chang; Wei Te Chung (57) ABSTRACT

An optical-electrical connector assembly comprises a housing, a printed circuit board received in the housing and including a number of converting elements, a lens member, a ferrule aligned with the lens member and having a resisting portion, an integrated securing member, a coiled spring received in the securing member, and an optical cable having a number of optical fibers. The ferrule has a first engaging portion and a second engaging portion engaged with the housing. The coiled spring is compressed between the resisting portion and the first engaging portion.

18 Claims, 7 Drawing Sheets

OPTICAL-ELECTRICAL CONNECTOR ASSEMBLY HAVING A SECURING MEMBER

CROSS-REFERENCE TO RELATED APPLICATIONS

This patent application relates to a U.S. patent application Ser. No. 13/419,659, filed on Mar. 14, 2012, entitled "OPTICAL ELECTRICAL CONNECTOR HAVING A RESILIENT MEMBER FOR URGING FERRULE AGAINST LENS MEMBER," which is assigned to the same assignee as this application.

BACKGROUND OF THE INVENTION

1. Field of the Invention

The present invention relates to an optical-electrical connector assembly, and more particularly to a securing member of the optical-electrical connector assembly for retaining a resilient member and connecting an optical cable.

2. Description of Related Art

U.S. Patent Application Publication No. 2011/0081119 published on Apr. 7, 2011 discloses a connector includes a housing, a paddle board received in the housing, a mounting plate vertically mounted on the paddle board, a lens block mounted in the mounting plate, a ferrule carrying a plurality of fibers, a package having an engaging portion engaged with the ferrule and a shoulder portion, a resilient member or spring confined between the ferrule and the shoulder portion of the package, and a cover engaged with the package and the lens block. The ferrule is aligned with the lens block reliably under a resilient force provided by the spring.

The ferrule is aligned with the lens block and the spring is secured to the ferrule by the package and the cover. The connector has a complicated configuration to provide the package and the cover.

Hence, an improved optical-electrical connector assembly having a securing member of a different construction is desired.

SUMMARY OF THE INVENTION

Accordingly, an object of the present invention is to provide an optical-electrical connector assembly having a simple configuration and an easy assembling process.

In order to achieve the above-mentioned objects, an optical-electrical connector assembly includes a housing, a printed circuit board, a lens member and a ferrule. The ferrule has a first end, a second end opposite to the first end, and a plurality of channels extending through the first end and the second end, the first end of the ferrule is aligned with the lens member along a front-to-back direction. An optical cable has a plurality of optical fibers received in the channels, respectively. An integrated securing member which is mounted to the housing comprises a first engaging portion, a second engaging portion engaged with the housing, a body portion, and a cavity defined in the body portion. The first engaging portion is formed by a stepped portion situated in the cavity. A mounting portion extends rearwardly from the rear end of the body portion which is connected with the optical cable. A resilient member is received in the cavity of the integrated securing member and compressed between the second end of the ferrule and the stepped portion of the integrated securing member.

According to the present invention, the resilient member is fixed by the integrated securing member, and the integrated securing member is mounted to the housing. Therefore, the electrical-optical connector assembly has a simple structure for ease of assembling.

Other objects, advantages and novel features of the invention will become more apparent from the following detailed description when taken in conjunction with the accompanying drawings.

DETAILED DESCRIPTION OF THE PREFERRED EMBODIMENT

Reference will now be made to the drawing figures to describe the present invention in detail.

Referring to FIGS. 1 to 7, an optical-electrical connector assembly 100 in accordance with the present invention includes a housing 10 comprising a base 11 and a cover 12 attached to an upper portion of the base 11. The base 11 defines a receiving space 110. The optical-electrical connector assembly 100 further includes a printed circuit board 3 received in the receiving space 110, an optical member 4, an integrated securing member 51 and a resilient member 52, a releasing mechanism 2, a restoring spring 81, a cover plate 82, a pair of screws 83 and an optical cable 6 having a plurality of optical fibers 64.

Figure 1:
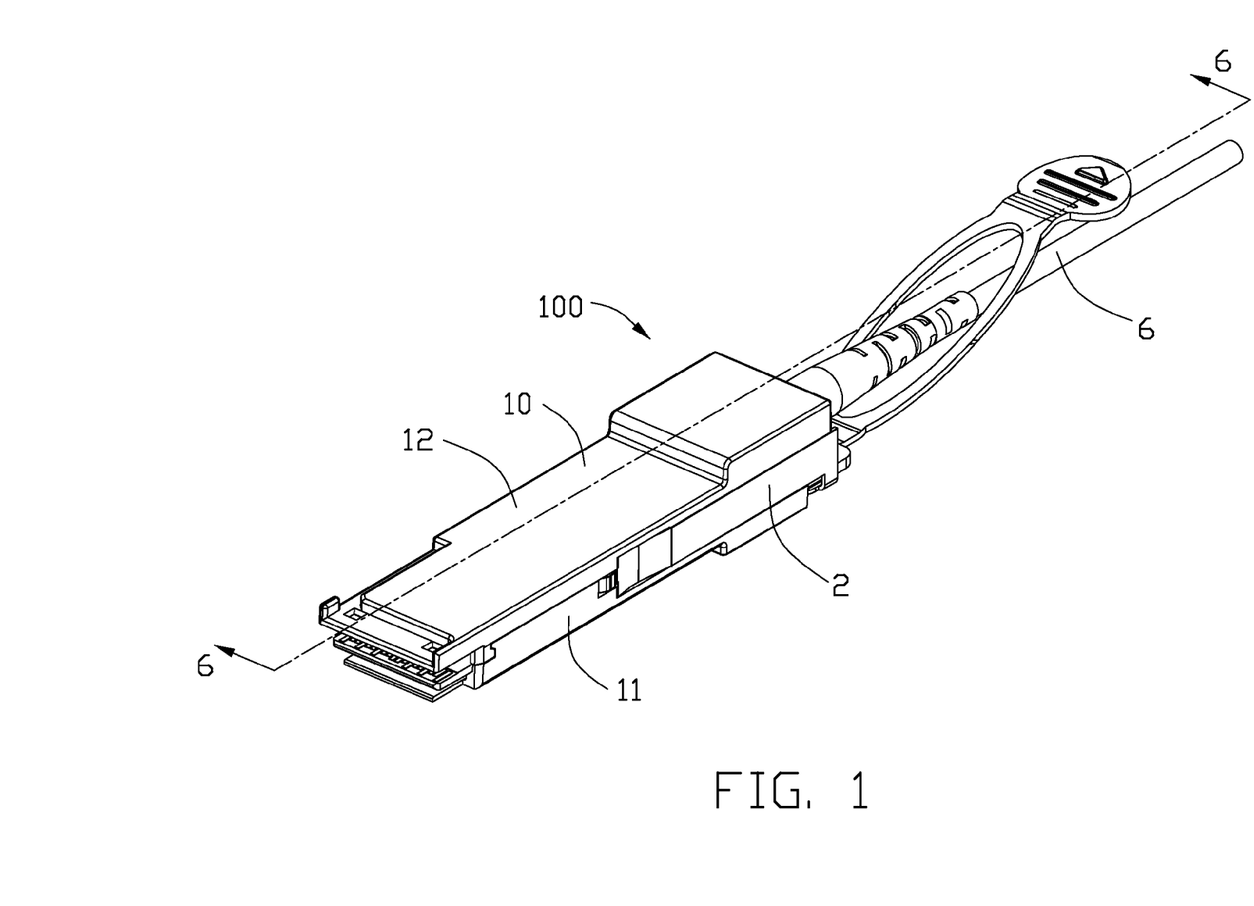
FIG. 1 is a perspective view of an optical-electrical connector assembly in accordance with the present invention.
Figure 2:
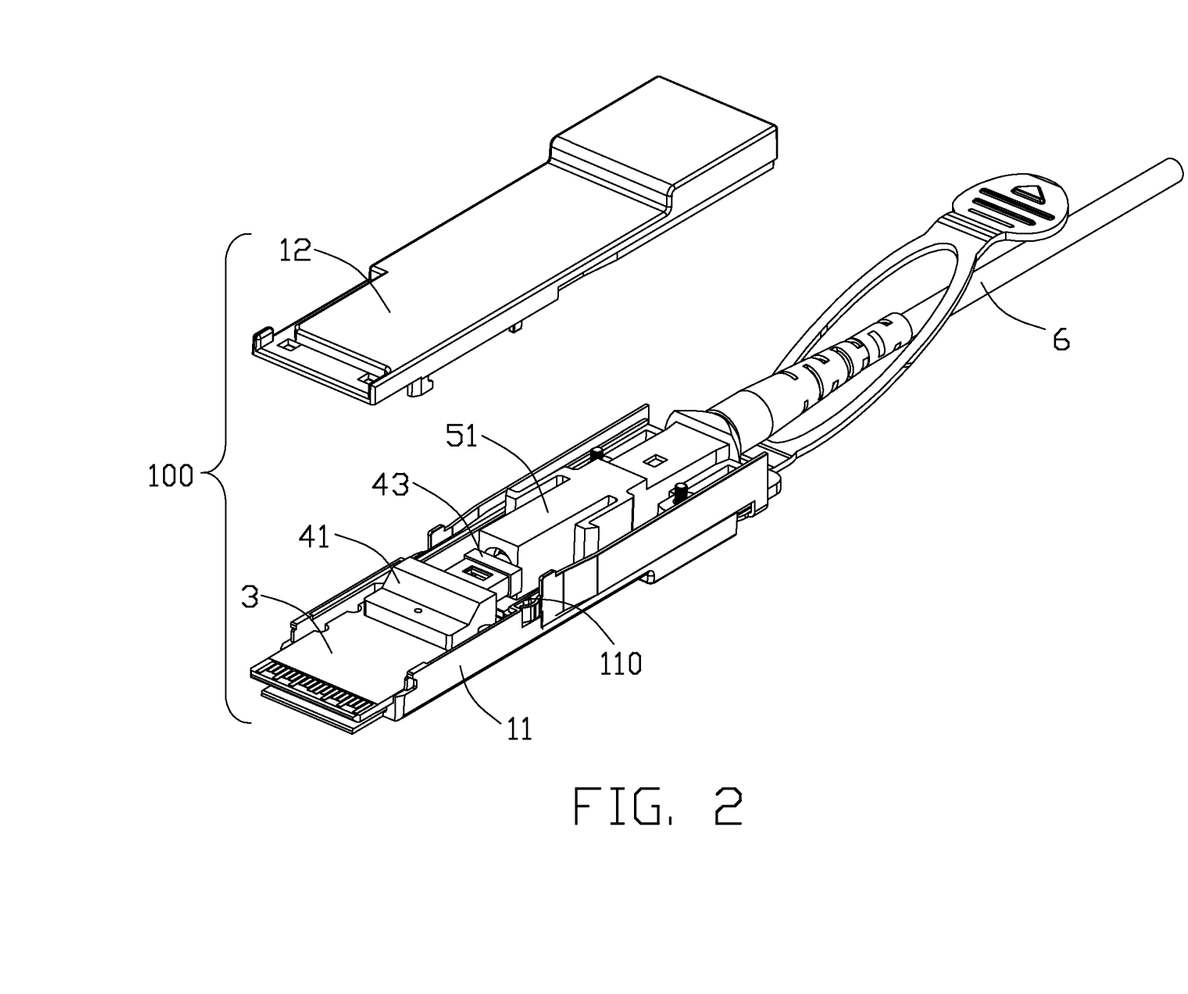
FIG. 2 is a partially exploded perspective view of the optical-electrical connector assembly as shown in FIG. 1, with a cover separated from a base.
Figure 3:
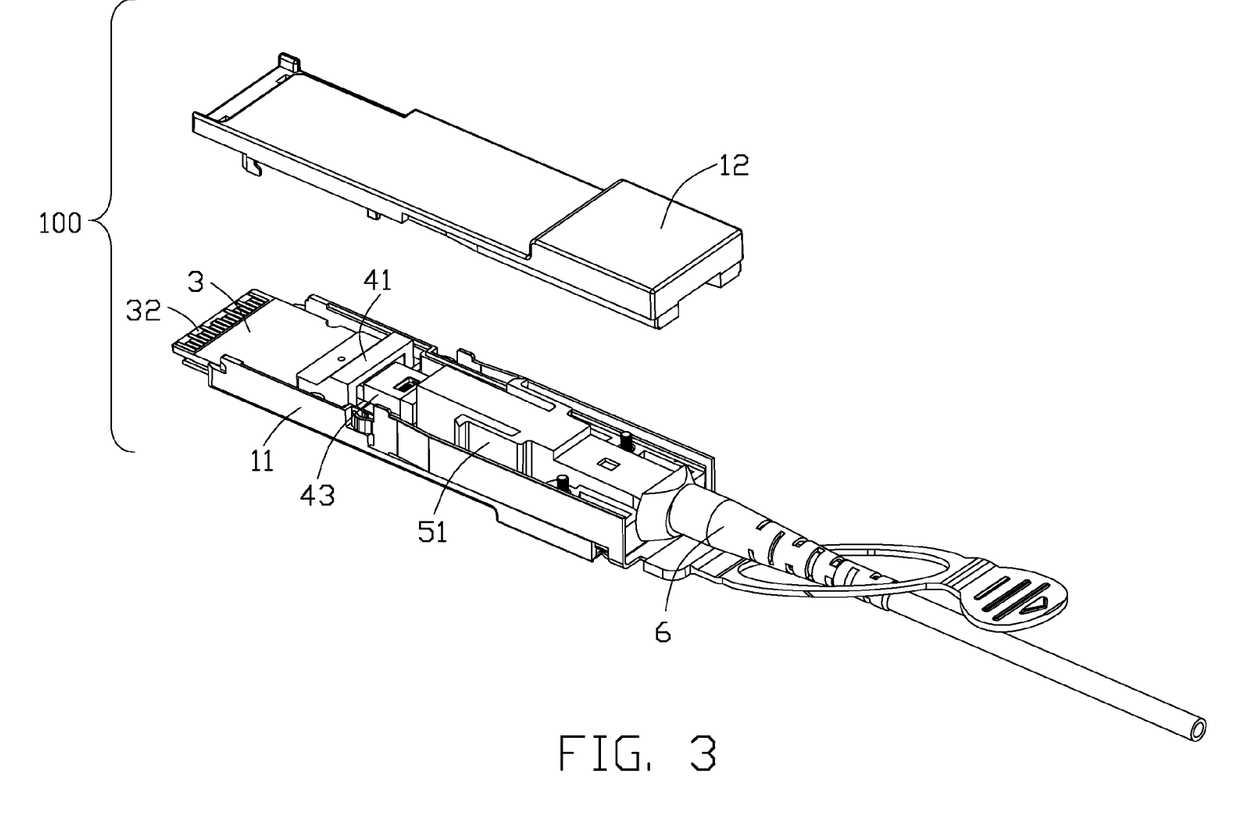
FIG. 3 is another partially exploded perspective view of the optical-electrical connector assembly as shown in FIG. 2.
Figure 4:
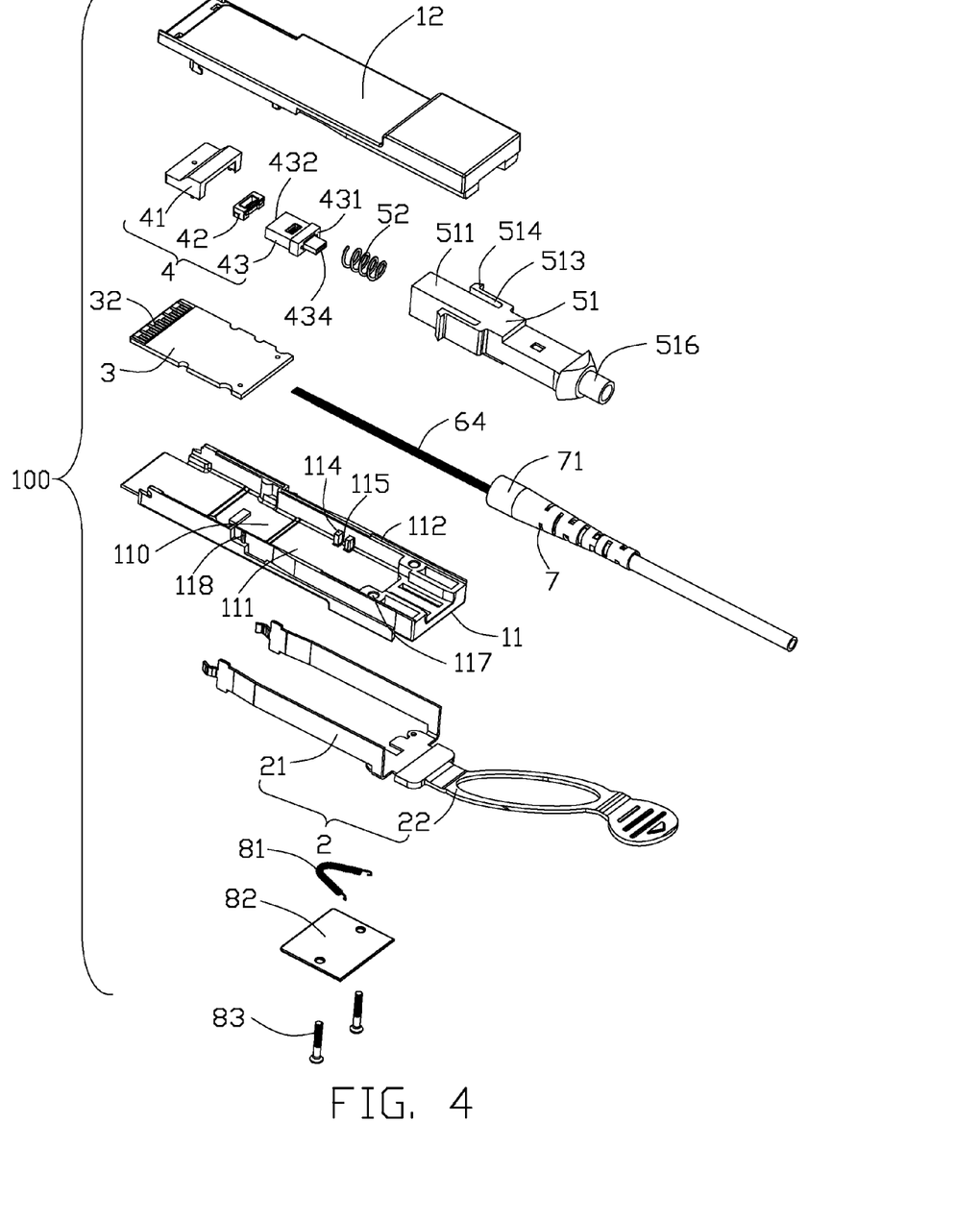
FIG. 4 is an exploded perspective view of the optical-electrical connector assembly of FIG. 1.
Figure 5:
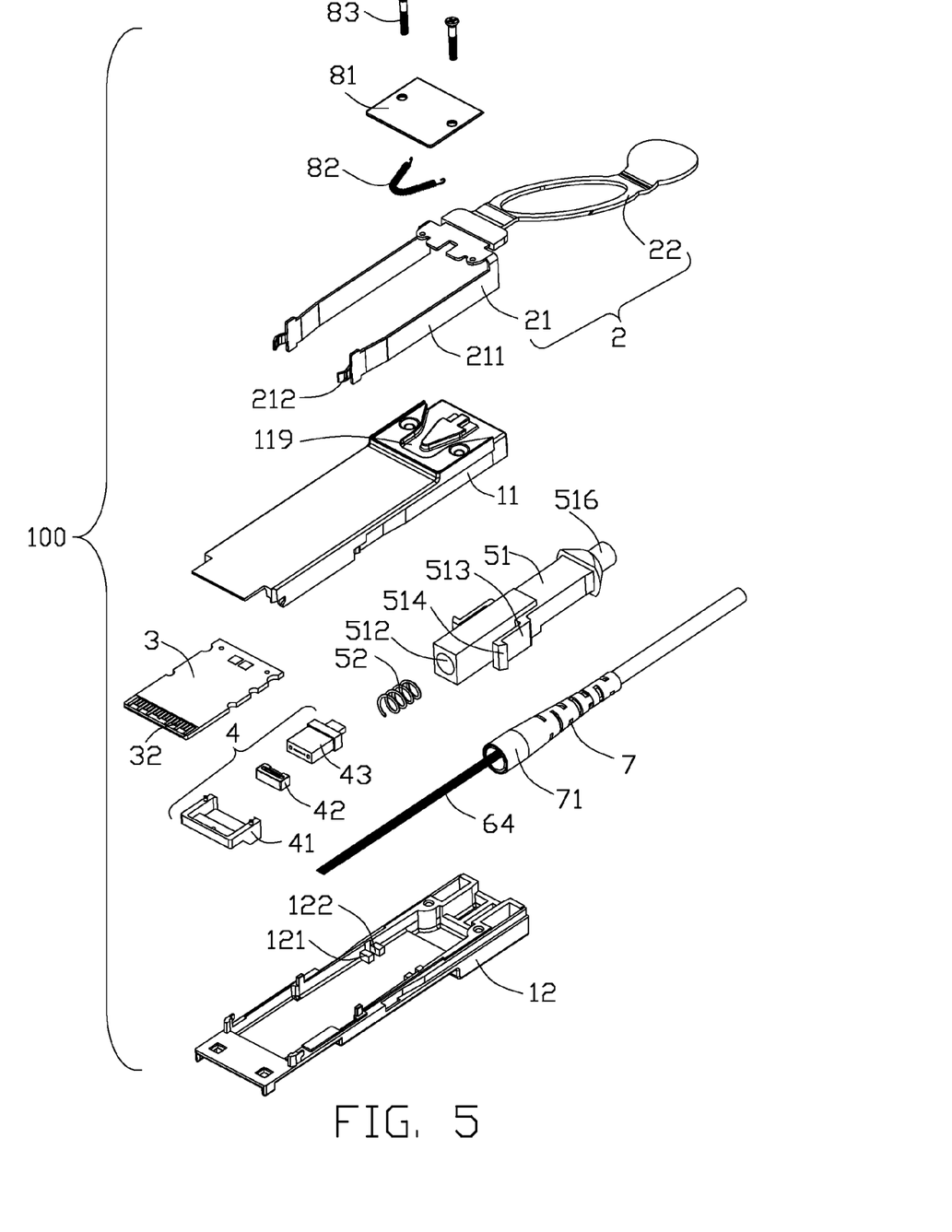
FIG. 5 is another exploded view of the optical-electrical assembly as shown in FIG. 4.
Figure 6:
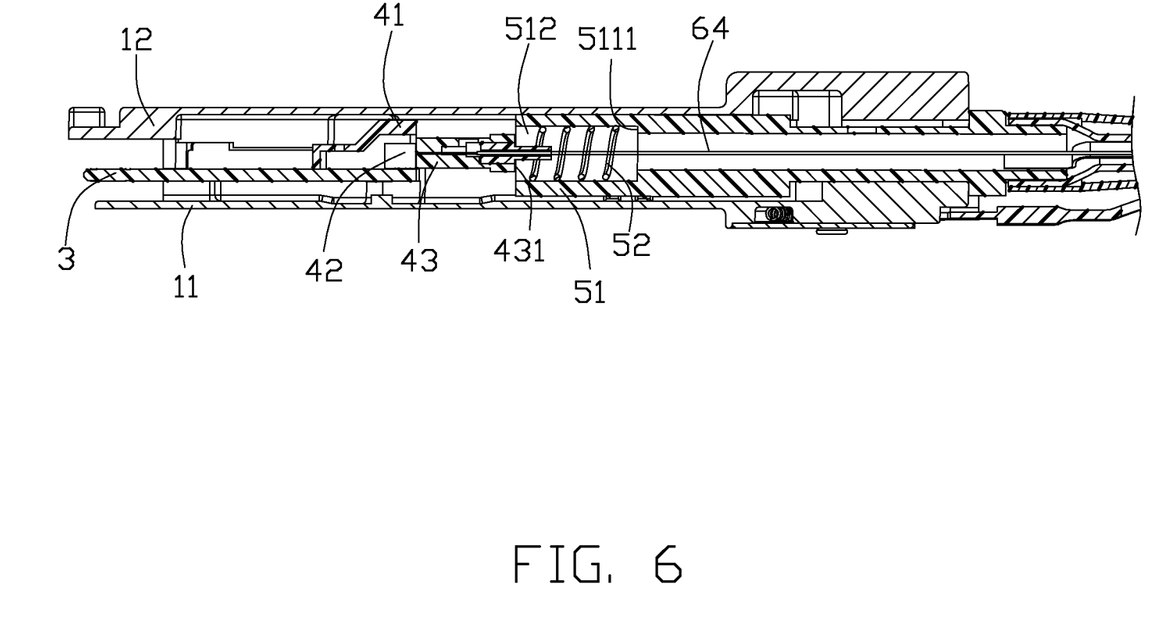
FIG. 6 is a cross-sectional view of the optical-electrical connector assembly taken along line 6-6 of FIG. 1.

Referring to FIGS. 4 to 5, the base 11 includes a bottom wall 111, a pair of side walls 112, and a pair of mounting holes 117 extending along an up to bottom direction. Each of the side walls 112 has a pair of securing portions 114 projecting into the receiving space 110, and a securing recess 115 formed between the pair of securing portions 114. Each of the side walls 112 defines a cooperating recess 118 located at an outer surface thereof. In conjunction with FIG. 5, the bottom wall 111 defines a confining recess 119 located at a bottom surface thereof.

The cover 12 includes two pairs of projection portions 121. A latching recess 122 is formed between one pair of the projection portions 121.

The printed circuit board 3 has a plurality of conductive pads 32 formed at a front end. As can be understood, a plurality of converting elements (not shown) well known to those skill in this art are included in or on the printed circuit board 3 for optical-electrical signal conversion in a way generally known.

The optical member 4 includes a lens member 42, a ferrule 43 having a first end 432, a second end 434 opposite to the first end 432 and a plurality of channels (not shown) extending through the first end 432 and the second end 434, a package portion 41 enclosing the lens member 42. In conjunction with FIG. 4, the ferrule 43 includes a resisting portion 431. The first end 432 of the ferrule 43 is aligned with the lens member 42 along a front-to-back direction.

The integrated securing member 51 includes a first engaging portion, a second engaging portion engaged with the housing 10, a body portion 511 defining a cavity 512 for receiving the optical fibers 64, and a mounting portion 516 extending rearwardly from a rear end of the body portion 511. The first engaging portion is formed by a stepped portion 5111 which is situated in the cavity 512. The body potion 511 has a pair of cantilevered arms 513 formed on two opposite outsides thereof. Each of the cantilevered arms 513 comprises a barb 514 located at the free end. An elastic deformation space (not labeled) is formed between each cantilevered arm 513 and the body portion 511. In the other embodiments, the cantilevered arm 513 is formed a projection portion from the body portion 511.

In this embodiment, the resilient member 52 is a coiled spring. In the other embodiments, the resilient member 52 is optionally formed by other resilient element, if only a forward resilient force could be provided to the ferrule 43.

The releasing mechanism 2 includes an releasing operator 21 having a pair of releasing arms 211, and an actuator 22. Each releasing arm 211 comprises a releasing portion 212 received in the cooperating recesses 118 of the base 11.

Figure 7:
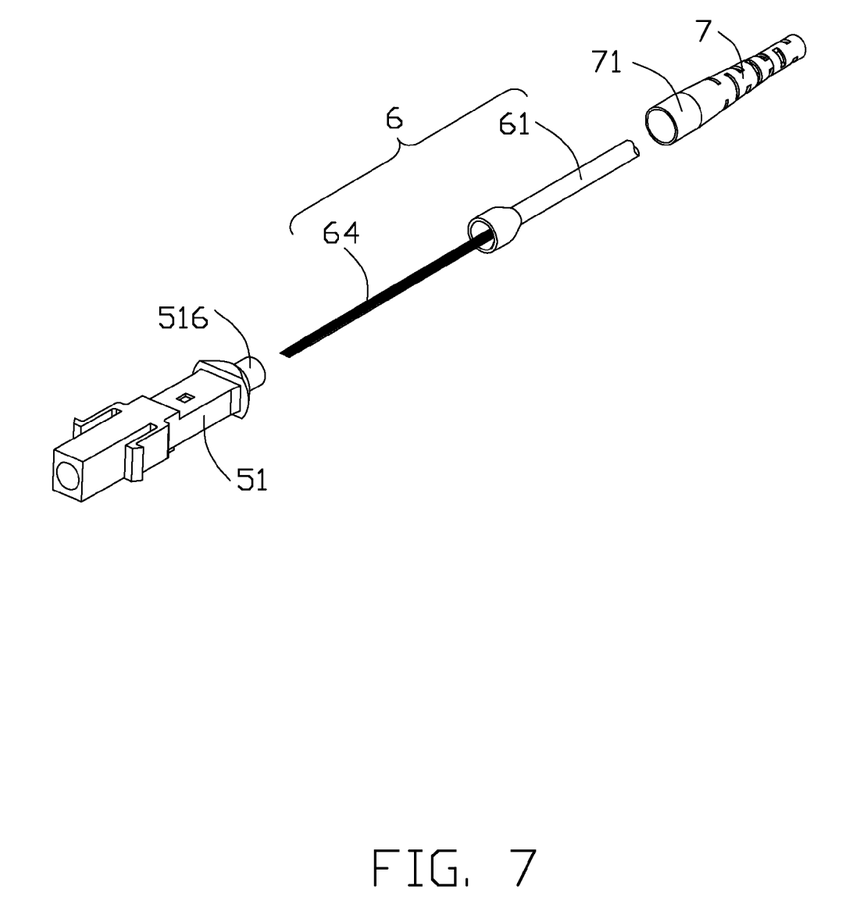
FIG. 7 is an exploded view of the securing member and the optical cable.

Referring to FIG. 7, the optical cable 6 includes a plurality of optical fibers 64 and a jacket 61 enclosing the optical fibers 64. The optical-electrical connector assembly 100 further includes a boot 71 enclosing the mounting portion 516 of the securing member 51 located at an end of the cable 6.

Referring to FIGS. 1 to 7, in assembling of the optical-electrical connector assembly 100, the lens member 42 is received in the package portion 41 and mounted on the printed circuit board 3. The resilient member 52 is received in the cavity 512 of the securing member 51. The printed circuit board 3, the ferrule 43 of the optical fibers 64 and the securing member 51 are received into the receiving space 110 of the base 11. In conjunction with FIG. 6, the resilient member 52 is permanently compressed between the resisting portion 431 of the ferrule 43 and the stepping potion 5111 of the securing member 51 for making the ferrule 43 close to the lens member 42 and further to make the optical fibers 64 close to the lens member 42. The two pair of the barbs 514 are engaged in the securing recess 115. The securing member 51 and the resilient member 52 is disposed as a hollow structure so that the optical fibers 64 can pass through the securing member 51 and the resilient member 52. The cover 12 is assembled upon the base 11. The barbs 514 of the securing member 51 are latched with the latching recesses 122, respectively.

The releasing portion 212 of the releasing operator 21 is received in the cooperating recess 118. In conjunction with FIG. 4, the restoring spring 81 is bent into a V-shape to connect with the releasing operator 21 and restricted in the confining recess 119. The restoring spring 81 is elastically deformed for providing the elastic force to the releasing mechanism 2 during the releasing process. The cover plate 82 is attached to the base 11 for covering the restoring spring 81. The screws 83 are screwed through the mounting holes 117 to fasten the cover 12 to the base 11.

Even if the optical-electrical connector assembly 100 is plugged into the mating connector many times, the resilient member 52 keeps compressed state between the ferrule 43 and the securing member 51 of the base 11 to provide an invariable resilient forward force to the ferrule 43 for mating the ferrule 43 to the lens member 42. Further, the optical fibers 64 located in the ferrule 43 are aligned with the lens member 42 along the front-to-back direction. In this invention, the resilient member 52 is fixed by the cavity 512 and the stepped portion 5111, and the resilient member 52 is connected by the mounted portion 516 and the optical cable 6. Finally, the barbs 514 of the securing member 51 are latched with the latching recesses 122 of the base 11. Compared to the prior art, a number of components become less so that the assembly processes of the optical-electrical connector become easier. More importantly, the integrated securing member 51 could provide a stable structure to fix the resilient member 42.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical-electrical connector assembly comprising:
    a housing comprising a base and a cover attached to an upper portion of the base;
    a releasing mechanism mounted on the base of the housing;
    a printed circuit board received in the housing;
    a lens member mounted on the printed circuit board;
    a ferrule received in the housing and having a first end, a second end opposite to the first end, and a plurality of channels extending through the first end and the second end, the first end of the ferrule aligned with the lens member along a front-to-back direction;
    an optical cable having a plurality of optical fibers received in the channels, respectively;
    an integrated securing member mounted to the housing and having a first engaging portion, a second engaging portion engaged with the housing, a body portion and a cavity defined in the body portion, and a rear mounting portion connected with the optical cable, said first engaging portion having a stepped portion situated in the cavity; and
    a resilient member received in the cavity of the integrated securing member and compressed between the second end of the ferrule and the stepped portion of the integrated securing member.

2. The optical-electrical connector assembly as claimed in claim 1, wherein the resilient member is a compression spring.

3. The optical-electrical connector assembly as claimed in claim 2, wherein the base has a pair of side walls each having a pair of securing portions and a securing recess between the pair of the securing portions.

4. The optical-electrical connector assembly as claimed in claim 1, wherein the second engaging portion comprises a pair of cantilevered arms extending from the body portion and each having a barb, a space being formed between each cantilevered arm and the body portion.

5. The optical-electrical connector assembly as claimed in claim 4, wherein the barb is latched with the securing recess.

6. The optical-electrical connector assembly as claimed in claim 1, wherein the cover comprises a pair of projection portions and a latching recess between the pair of projection portions, and the second engaging portion of the securing member is latched with the latching recess.

7. An optical-electrical connector assembly comprising:
    an housing defining a receiving space therein;
        a printed circuit board disclosed in a front portion of the receiving space to define a mating port around a front area thereof and a connecting port around a rear area thereof;
        an optical member located around the are area of the printed circuit board and including a lens member immovably located upon the rear area, and a ferrule moveably located behind the lens member in a front-to-back direction; and a unitary securing member fixed to the housing and located behind the optical member, said securing member defining a front section equipped with a spring to constantly urge the ferrule forwardly, and a rear section extending around a rear end of the housing and secured to a boot surrounding an optical fiber cable around the rear end of the housing; wherein an inner optical fiber of said optical fiber cable extends forwardly into the securing member and reaches the ferrule to couple to the lens member.

8. The optical-electrical connector assembly as claimed in claim 7, wherein said rear section of the securing member extends out of the rear end of the housing.

9. The optical-electrical connector assembly as claimed in claim 7, wherein the boot is fully exposed outside of the rear end of the housing.

10. The optical-electrical connector assembly as claimed in claim 7, wherein said spring is in a form of coil through which said optical fibers extend.

11. The optical-electrical connector assembly as claimed in claim 10, wherein said spring is snugly and fully received in a recess formed in the front section of the securing member.

12. The optical-electrical connector assembly as claimed in claim 7, wherein a rear end section of the ferrule extends into the recess.

13. The optical-electrical connector assembly as claimed in claim 7, wherein a cross-section of the front section of the securing member is larger than that of the rear section of the securing member.

14. The optical-electrical connector assembly as claimed in claim 13, wherein a rear end section of the housing is equipped with a releasing mechanism for unlatching the connector assembly from a complementary connector, and the rear end section of the housing defines a cross-section which is larger than that of remaining portions of the housing, and an interface between the front section of the securing member and the rear section of the securing member is located in the rear end section of the housing.

15. The optical-electrical connector assembly as claimed in claim 7, wherein the rear section of the securing member defines a shoulder forwardly abutting against the rear end of the housing for preventing forward movement of the securing member relative to the housing, and a barb structure preventing at least rearward movement of the securing member relative to the housing.

16. An optical-electrical connector assembly comprising:

a housing defining a receiving space therein;

a printed circuit board disclosed in a front portion of the receiving space to define a mating port around a front area thereof and a connecting port around a rear area thereof;

an optical member located around the are area of the printed circuit board and including a lens member immovably located upon the rear area, and a ferrule moveably located behind the lens member in a front-to-back direction; and a unitary securing member fixed to the housing and located behind the optical member, said securing member defining a front section equipped with a spring to constantly urge the ferrule forwardly, and a rear section extending around a rear end of the housing; and an optical fiber cable comprising an inner optical fiber extending forwardly into the securing member and reaching the ferrule to couple to the lens member; wherein a cross-section of the front section of the securing member is larger than that of the rear section of the securing member; wherein a rear end section of the housing is equipped with a releasing mechanism for unlatching the connector assembly from a complementary connector, and the rear end section of the housing defines a cross-section which is larger than that of remaining portions of the housing, and an interface between the front section of the securing member and the rear section of the securing member is located in the rear end section of the housing.

17. The optical-electrical connector assembly as claimed in claim 16, wherein a rear section of the securing member extends out of the rear end of the housing and defines a shoulder forwardly abutting against the rear end of the housing for preventing forward movement of the securing member relative to the housing.

18. The optical-electrical connector assembly as claimed in claim 17, wherein said securing member further defines a barb structure preventing at least rearward movement of the securing member relative to the housing.

\* \* \* \* \*